(12) United States Patent
Yuan et al.

(10) Patent No.: US 10,510,013 B2
(45) Date of Patent: Dec. 17, 2019

(54) MIXED PROPOSAL BASED MODEL TRAINING SYSTEM

(71) Applicant: Microsoft Technology Licensing, LLC, Redmond, WA (US)

(72) Inventors: Jinhui Yuan, Beijing (CN); Tie-Yan Liu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 1068 days.

(21) Appl. No.: 14/800,700

(22) Filed: Jul. 16, 2015

(65) Prior Publication Data

US 2016/0328656 A1 Nov. 10, 2016

(30) Foreign Application Priority Data

May 8, 2015 (WO) ................ PCT/CN2015/078592

(51) Int. Cl.
*G06N 7/00* (2006.01)
*G06F 17/27* (2006.01)
*G06N 20/00* (2019.01)

(52) U.S. Cl.
CPC ......... *G06N 7/005* (2013.01); *G06F 17/2705* (2013.01); *G06F 17/277* (2013.01); *G06N 20/00* (2019.01)

(58) Field of Classification Search
CPC ...... G06N 99/005; G06N 5/025; G06N 7/005; G06K 9/6256; G06K 9/6269

(Continued)

(56) References Cited

U.S. PATENT DOCUMENTS 6,104,989 A * 8/2000 Kanevsky ........... G06F 17/2715
704/257
6,963,830 B1 * 11/2005 Nakao ............... G06F 17/30719
704/1

(Continued)

FOREIGN PATENT DOCUMENTS

| CN | 101354714 A | 1/2009 |
| CN | 103116588 A | 5/2013 |
| CN | 103207899 A | 7/2013 |

OTHER PUBLICATIONS

Velez, et al., "Graph-Sparse LDA: A Topic Model with Structured Sparsity", In Journal of Computing Research Repository, Nov. 24, 2014, 12 pages.

(Continued)

*Primary Examiner* — Scott A. Waldron
*Assistant Examiner* — Viker A Lamardo
(74) *Attorney, Agent, or Firm* — Davin Chin; Chin IP, PLLC

(57) ABSTRACT

In implementations of the subject matter described herein, each token for containing an element in the training data is sampled according to a factorization strategy in training. Instead of using a single proposal, the property value of the target element located at the token being scanned is iteratively updated one or more times based on a combination of an element proposal and a context proposal. The element proposal tends to accept a value that is popular for the target element independently of the current piece of data, while the context proposal tends to accept whenever the property value that is popular in the context of the target data or popular for the element itself. The proposed modeling training approach can converge in a quite efficient way.

20 Claims, 5 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 7,813,915 | B2* | 10/2010 | Nakao | G06F 17/2745 |
| | | | | 704/10 |
| 8,352,384 | B2 | 1/2013 | Mansinghka et al. | |
| 8,510,257 | B2 | 8/2013 | Archambeau et al. | |
| 8,527,448 | B2 | 9/2013 | Vladislav et al. | |
| 2002/0052730 | A1* | 5/2002 | Nakao | G06F 17/27 |
| | | | | 704/10 |
| 2002/0184267 | A1* | 12/2002 | Nakao | G06F 17/30719 |
| | | | | 715/255 |
| 2010/0332503 | A1 | 12/2010 | Buckley et al. | |
| 2012/0078918 | A1 | 3/2012 | Somasundaran et al. | |
| 2012/0290599 | A1* | 11/2012 | Tian | G06F 17/30616 |
| | | | | 707/758 |
| 2014/0129510 | A1 | 5/2014 | Vladislav et al. | |
| 2014/0181214 | A1 | 6/2014 | Price | |
| 2014/0214397 | A1* | 7/2014 | Dymetman | G06F 17/2818 |
| | | | | 704/2 |
| 2014/0272914 | A1 | 9/2014 | Baraniuk et al. | |
| 2014/0365404 | A1 | 12/2014 | Bart et al. | |

OTHER PUBLICATIONS

Lin, et al., "The Dual-Sparse Topic Model: Mining Focused Topics and Focused Terms in Short Text", In Proceedings of the 23rd international conference on World wide web, Apr. 7, 2014, pp. 539-549.

Williamson, et al., "The IBP Compound Dirichlet Process and its Application to Focused Topic Modeling", In Proceedings of the 27th International Conference on Machine Learning, Jun. 21, 2010, 8 pages.

Soleimani, et al., "Parsimonious Topic Models with Salient Word Discovery", In Proceedings of IEEE Transactions on Knowledge and Data Engineering, vol. 27, Issue 3, Sep. 5, 2014, 14 pages.

Faisal, et al., Abstract of "Transfer Learning Using a Nonparametric Sparse Topic Model", In Proceedings of Neurocomputing, vol. 112, Jul. 18, 2013, 3 pages.

Yuan, et al., "LightLDA: Big Topic Models on Modest Compute Clusters", In Journal of Computing Research Repository, Jan. 5, 2015, pp. 1-19.

Ahmed, et al., "Scalable Inference in Latent Variable Models", In Proceedings of Fifth ACM International Conference on Web Search and Data Mining, Feb. 8, 2012, pp. 123-132.

Airoldi, et al., "Mixed Membership Stochastic Blockmodels", In Journal of Machine Learning Research, vol. 9, Jun. 1, 2008, pp. 1981-2014.

Andrieu, et al., "An Introduction to MCMC for Machine Learning", In Journal of Machine Learning, vol. 50, Issue 1-2, Jan. 2003, pp. 5-43.

Blei, et al., "Latent Dirichlet Allocation", In Journal of Machine Learning Research, vol. 3, Issue 30, Mar. 1, 2003, pp. 993-1022.

Dai, et al., "High-Performance Distributed ML at Scale through Parameter Server Consistency Models", In Proceedings of Twenty-Ninth AAAI Conference on Artificial Intelligence, Jan. 25, 2015, 9 pages.

Griffiths, et al., "Finding Scientific Topics", In Proceedings of National Academy of Sciences of the United States of America, vol. 101, Issue 1, Apr. 6, 2004, pp. 5228-5235.

Hastings, W. K., "Monte Carlo Sampling Methods Using Markov Chains and Their Applications", In Biometrika, vol. 57, No. 1, Apr. 1970, pp. 97-109.

Ho, et al., "More Effective Distributed MI via a Stale Synchronous Parallel Parameter Server", In Proceedings of Advances in Neural Information Processing Systems 26, Dec. 5, 2013, pp. 1-9.

Lee, et al., "On Model Parallelization and Scheduling Strategies for Distributed Machine Learning", In Proceedings of Neural Information Processing Systems, Dec. 11, 2014, pp. 1-9.

Li, et al., "Reducing the Sampling Complexity of Topic Models", In Proceedings of 20th ACM SIGKDD International Conference on Knowledge Discovery and Data Mining, Aug. 24, 2014, pp. 891-900.

Li, et al., "Scaling Distributed Machine Learning with the Parameter Server", In Proceedings of 11th USENIX Conference on Operating Systems Design and Implementation, Oct. 6, 2014, pp. 583-598.

Liu, et al., "PLDA+: Parallel Latent Dirichlet Allocation with Data Placement and Pipeline Processing", In Journal of ACM Transactions on Intelligent Systems and Technology, vol. 2, Issue 3, Apr. 1, 2011, 18 pages.

Marsaglia, et al., "Fast Generation of Discrete Random Variables", In Journal of Statistical Software, vol. 11, Issue 3, Jul. 2004, pp. 1-11.

Metropolis, et al., "Equation of State Calculations by Fast Computing Machines", In Journal of Chemical Physics, vol. 21, Issue 6, Dec. 23, 2004, pp. 1087-1091.

Newman, et al., "Distributed Algorithms for Topic Models", In Journal of Machine Learning Research, vol. 10, Dec. 1, 2009, pp. 1801-1828.

Power, et al., "Piccolo: Building Fast, Distributed Programs with Partitioned Tables", In Proceedings of 9th USENIX Conference on Operating Systems Design and Implementation, Oct. 4, 2010, pp. 1-14.

Shringarpure, et al., "mStruct: Inference of Population Structure in Light of Both Genetic Admixing and Allele Mutations", In Journal of Genetics, vol. 182, Issue 2, Apr. 10, 2009, 49 pages.

Smola, et al., "An Architecture for Parallel Topic Models", In Proceedings of 36th International Conference on Very Large Data Bases Endowment, vol. 3, Issue 1-2, Sep. 13, 2010, pp. 703-710.

Tierney, Luke, "Markov Chains for Exploring Posterior Distributions", In Journal of Annals of Statistics, vol. 22, No. 4, Dec. 1994, pp. 1701-1728.

Walker, Alastair J., "An Efficient Method for Generating Discrete Random Variables with General Distributions", In Journal of ACM Transactions on Mathematical Software, vol. 3, Issue 3, Sep. 1, 1977, pp. 253-256.

Wang, et al., "Towards Topic Modeling for Big Data", In Journal of Computing Research Repository, May 2014, 9 Pages.

Yao, et al., "Efficient Methods for Topic Model Inference on Streaming Document Collections", In Proceedings of 15th ACM SIGKDD International Conference on Knowledge Discovery and Data Mining, Jun. 28, 2009, pp. 937-945.

Yin, et al., "A Scalable Approach to Probabilistic Latent Space Inference of Large-Scale Networks", In Proceedings of Neural Information Processing Systems, Dec. 5, 2013, pp. 1-9.

Zheng, et al., "Model-Parallel Inference for Big Topic Models", In Journal of Computing Research Repository, Nov. 2011, pp. 1-12.

Zhu, et al., "MedLDA: Maximum Margin Supervised Topic Models for Regression and Classification", In Proceedings of 26th International Conference on Machine Learning, Jun. 14, 2009, pp. 1257-1264.

"International Search Report & Written Opinion Issued in PCT Application No. PCT/CN2015/078592", dated Feb. 6, 2016, 12 Pages.

* cited by examiner

MIXED PROPOSAL BASED MODEL TRAINING SYSTEM

RELATED APPLICATIONS

This application claims priority to International Application No. PCT/CN2015/078592, filed on May 8, 2015, and entitled "MIXED PROPOSAL BASED MODEL TRAINING SYSTEM." This application claims the benefit of the above-identified application, and the disclosure of the above-identified application is hereby incorporated by reference in its entirety as if set forth herein in full.

BACKGROUND

Topic model (TM) is a popular and important machine learning technology that has been widely used in text mining, network analysis and genetics, and more other domains. For example, in TMs, a document can be assumed to be characterized by a particular set of topics. In general, a topic is identified on the basis of supervised labeling and pruning on the basis of their likelihood of co-occurrence and has probabilities of generating various words. For example, a TM may have topics "CAT" and "DOG." Words such as milk, meow, and kitten can be assigned to the topic "CAT," while words such as puppy, bark, and bone can be assigned to the topic "DOG".

Latent Dirichlet Allocation (LDA) model is an example of a topic model. LDA is a generative model that allows sets of observations to be explained by unobserved groups that explain why some parts of the data are similar. In LDA, each document is a mixture of a small number of topics and that each word's creation is attributable to one of the document's topics. Moreover, in LDA the topic distribution is assumed to have a Dirichlet prior distribution.

Web-scale corpus are significantly more complex than smaller, well-curated document collections and thus require high-capacity topic parameter spaces featuring up to millions of topics and vocabulary words. Processing a web-scale corpus through an LDA model, however, suffers from high computational costs.

SUMMARY

In accordance with implementations of the subject matter described herein, a new approach for model training is proposed. Each piece of data in the training corpus is scanned on a token-by-token basis. A token can be considered as a container for an element in the data. For example, a token may be a position in the document at which a word can be located. In the scanning, each token is sampled according to a factorization strategy. More specifically, instead of using a single proposal, the property value of the target element located at the token being scanned may be iteratively updated one or more times based on a combination of an element proposal and a context proposal. The element proposal tends to accept a value that is popular for the target element independently of the current piece of data, while the context proposal tends to accept whenever the property value that is popular in the context of the target data or popular for the element itself. The topic of the element can then be determined based on a combination of the element proposal and the context proposal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," "third" and the like may refer to different or same objects. Other definitions, explicit and implicit, may be included below.

Figure 1:
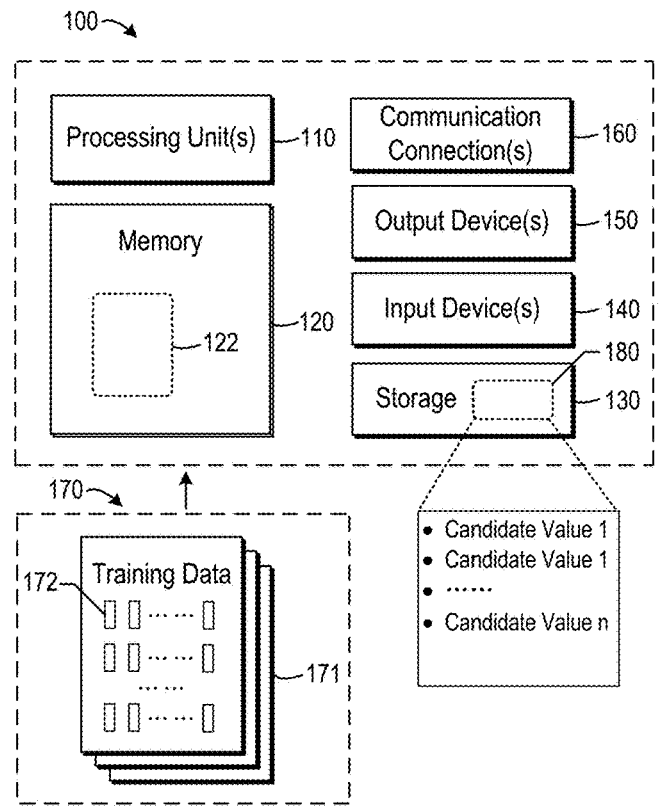
FIG. 1 illustrates a block diagram of an environment in which one or more implementations of the subject matter described herein can be implemented.

FIG. 1 illustrates an example of an environment 100 in which one or more implementations of the subject matter described herein may be implemented. The environment 100 is not intended to suggest any limitation as to scope of use or functionality of the subject matter described herein, as various implementations may be implemented in diverse general-purpose or special-purpose computing environments.

With reference to FIG. 1, the environment 100 includes a device 101. In some implementations, the device 101 may be a server which is adapted for data processing. The model training may be performed on the device 101. Although shown as a standalone machine, the device 101 can include a plurality of machines in other implementations. For example, in one implementation, the device 101 may be implemented in a cluster of networked servers.

As shown, the device 101 includes at least one processing unit (or processor) 110 and a memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination thereof. The memory 120 may contain modules or logic for model training.

For example, in some implementations, the memory 120 may include computer program 122 including modules or logic for model training. The computer program 122 may at least include a module for determining an element proposal, a module for determining a context proposal and a module for updating the property value. In operation, these modules are loaded into the memory 120 and executed by the processing unit 110 to determine the topic of elements in the data. Example implementations of these modules will be discussed in the following paragraphs.

The device 101 may have additional components or features. In the example shown in FIG. 1, the device 101 includes storage 130, one or more input devices 140, one or more output devices 150, and one or more communication connections 160. An interconnection mechanism (not shown) such as a bus, controller, or network interconnects the components of the device 101. Typically, operating system software (not shown) provides an operating environment for other software executing in the device 101, and coordinates activities of the components of the device 101.

The storage 130 may be removable or non-removable, and may include computer-readable storage media such as flash drives, magnetic disks or any other medium which can be used to store information and which can be accessed within the device 101. The input device(s) 140 may be one or more of various different input devices. For example, the input device(s) 140 may include a user device such as a mouse, keyboard, trackball, etc. The input device(s) 140 may implement one or more natural user interface techniques, such as speech recognition or touch and stylus recognition. As other examples, the input device(s) 140 may include a scanning device; a network adapter; or another device that provides input to the device 101. The output device(s) 150 may be a display, printer, speaker, network adapter, or another device that provides output from the device 101. The input device(s) 140 and output device(s) 150 may be incorporated in a single system or device, such as a touch screen or a virtual reality system.

The communication connection(s) 160 enables communication over a communication medium to another computing entity. Additionally, functionality of the components of the device 101 may be implemented in a single computing machine or in multiple computing machines that are able to communicate over communication connections. Thus, the device 101 may operate in a networked environment using logical connections to one or more other servers, network PCs, or another common network node. By way of example, and not limitation, communication media include wired or wireless networking techniques.

As shown in FIG. 1, the environment 100 further includes a corpus 170. The corpus 170 is accessible to the device 101 and includes one or more pieces of training data 171. Each piece of training data 171 contains a plurality of elements 172 located at respective tokens. For example, in one implementation, the training data 171 may include a plurality of documents. A document contains one or more words located at respective positions. The training data 171 may be input into the device 101 or otherwise accessible to the device 101. The device 101 may store the training data 171 or a part thereof in the storage 130, for example.

The elements 172 in the training data 171 have at least a property. The purpose of the model training is to determine a value of the property of each element 172 in the training data 171. For instance, in those implementations where the training data 171 include documents, the property may be the topic of words contained in the documents. In such implementations, each word is assigned with a topic value during the model training. For example, for a word "Bush," the candidate topic values may include "PRESIDENT ELECTION," "PLANT," and the like. The possible candidate values for the property may be determined in advance and stored in a list maintained in the device 101. The candidate property values can be specified manually by the user, for example. Alternatively, the candidate property values can be determined according to the statistics obtained from the previous model training. In one implementation, the device 101 may store the list 180 of candidate property values in the storage 130. The list 180 can be also stored at any other suitable location accessible to the device 101.

Implementations of the subject matter can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the device 101, computer-readable storage media include memory 120, storage 130, and combinations thereof.

Implementations of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various implementations. Computer-executable instructions for program modules may be executed within a local or distributed computing environment. In a distributed computing environment, program modules may be located in both local and remote computer storage media.

In general, in accordance with implementations of the subject matter described herein, a corpus including a plurality of pieces of training data is used to train and test the models. As described above, each piece of data has one or more tokens. In the context of the present disclosure, a token may be considered a position at which an element may be located. An element is a content item located at a token in the training data. By way of example, the corpus may include a plurality of documents serving as the training data. In this case, the elements may be words in the documents. An element may have one or more properties, each of which can be assigned with a certain value. Still considering the example where the training data includes documents, an example property of the elements is the topic of each word. There may be a plurality of candidate topics such as "Sport," "Politics," "Technology," and the like. Through training, each word will be assigned with one of these candidate topics.

In accordance with implementations of the subject matter described herein, in every token in each piece of data in the corpus is scanned and sampled in the training Instead of the using a single proposal distribution to determine the property value, the sampling is done according to a factorization strategy. More specifically, two different kinds of proposals, namely, the element proposal and context proposal are used in combination such that the sampling can be done in an efficient way. In general, the element proposal indicates a probability that a given candidate value is assigned to the property of the target element independently of the context of the target data, while the context proposal indicates a probability that a given candidate value is assigned to the property in the context of the current target data. Further details will be discussed on the following paragraphs.

Figure 2:
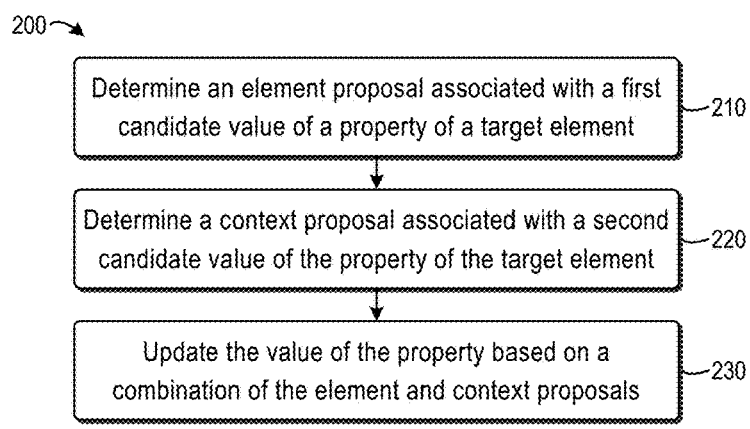
FIG. 2 illustrates a flowchart of a method for model training in accordance with one implementation of the subject matter described herein.

FIG. 2 illustrates a flowchart of method 200 for token sampling in the model training in accordance with one implementation of the subject matter described herein. The method 200 may be implemented by the computer program 122 in the device 101 as shown in FIG. 1, for example. In the following discussion, for the sake of discussion, the current piece of data is referred to as the "target data," and the element located at the token being sampled in the target data is referred to as the "target element."

As shown, the method 200 is entered at step 210, where an element proposal associated with a candidate value (referred to as the "first candidate value") of a property of a target element is determined, where the target element is located at the token being scanned. As discussed above, the property may have multiple candidate values. These candidate values may be determined in advance. For example, in some implementations, the candidate values may be determined according to the statistics, experience, user specification, and the like. In one implementation, the first candidate value as used in step 210 may be selected from the predetermined candidate values according to the prior probability distribution of these candidate values. Example implementations will be discussed below.

In accordance with implementations of the subject matter described herein, the element proposal or element-proposal distribution indicates a probability that the first candidate value is assigned to the property of the target element independently of the context of the target data. That is, the element proposal is element-dependent but target data-independent. As such, it would be appreciated that the element proposal tends to accept a property value that is popular for the target element regardless of the current piece of data in which the target element is included. By way of example, for a word, the element proposal indicates the probability that the word is assigned to a given topic, without considering the context of the document where the word is contained. The element proposal may be determined in various ways, which will be discussed in the following paragraphs.

In step 220, a context proposal associated with a candidate value (referred to as the "second candidate value") for the property of the target element is determined. In one implementation, the second candidate value as used in step 220 may be selected from the predetermined candidate values according to the prior probability distribution of these candidate values. The second candidate value may or may not be the same as the first candidate value.

In accordance with implementations of the subject matter described herein, the context proposal or context-proposal distribution indicates a probability that the second candidate value is assigned to the property in the context of the current target data. That is to say, the context proposal is element-dependent while target data-dependent. As such, the context proposal tends to accept either the value that is popular within the current piece of data or the value that is popular for the element itself. By way of example, for a word, the context proposal indicates the probability that the word is assigned to a given topic while taking the context of the current document into account. The context proposal may be determined in various ways, which will be discussed in the following paragraphs.

It would be appreciated that in FIG. 2, the element proposal is shown to be determined prior to the context proposal. This is merely for the purpose of illustration without suggesting any limitations on the scope of the subject matter described herein. It is also possible that the element proposal is determined after or in parallel with the context proposal.

The method 200 then proceeds to step 230 where the current value of the property of the target element is updated based on a combination of the element proposal determined in step 210 and the context proposal determined in step 220. In accordance with implementations of the subject matter described herein, in step 230, the element proposal and the context proposal may be combined in any suitable ways. For example, in one implementation, the weighted combination may be used. In this implementation, the mixed proposal $p_m$ associated with a candidate value k can be obtained as follows:

$$p_m(k)=\lambda p_d(k)+(1-\lambda)p_w(k)$$

where $p_w$ represents the element proposal, $p_d$ represents the context proposal, and $\lambda$ represents the weight. In one implementation, the parameter $\lambda$ may be a value in the range of [0, 1], for example.

Alternatively, in one implementation, the element proposal and the context proposal may be combined in a cycle or alternative way. That is, the element proposal and context proposal are alternately utilized to update the property value. Such cycle combination of the element proposal and the context proposal can be expressed as follows:

$$p_c(k)\propto p_d(k)p_w(k)$$

In this implementation, for each element, the property value is first updated (either changed or maintained) based on the element proposal and then is further updated based on the context proposal. Through these two rounds of iterations, the convergence can be achieved quickly. Now example implementations of the cycle combination of the element proposal and the context proposal will be discussed.

Figure 3:
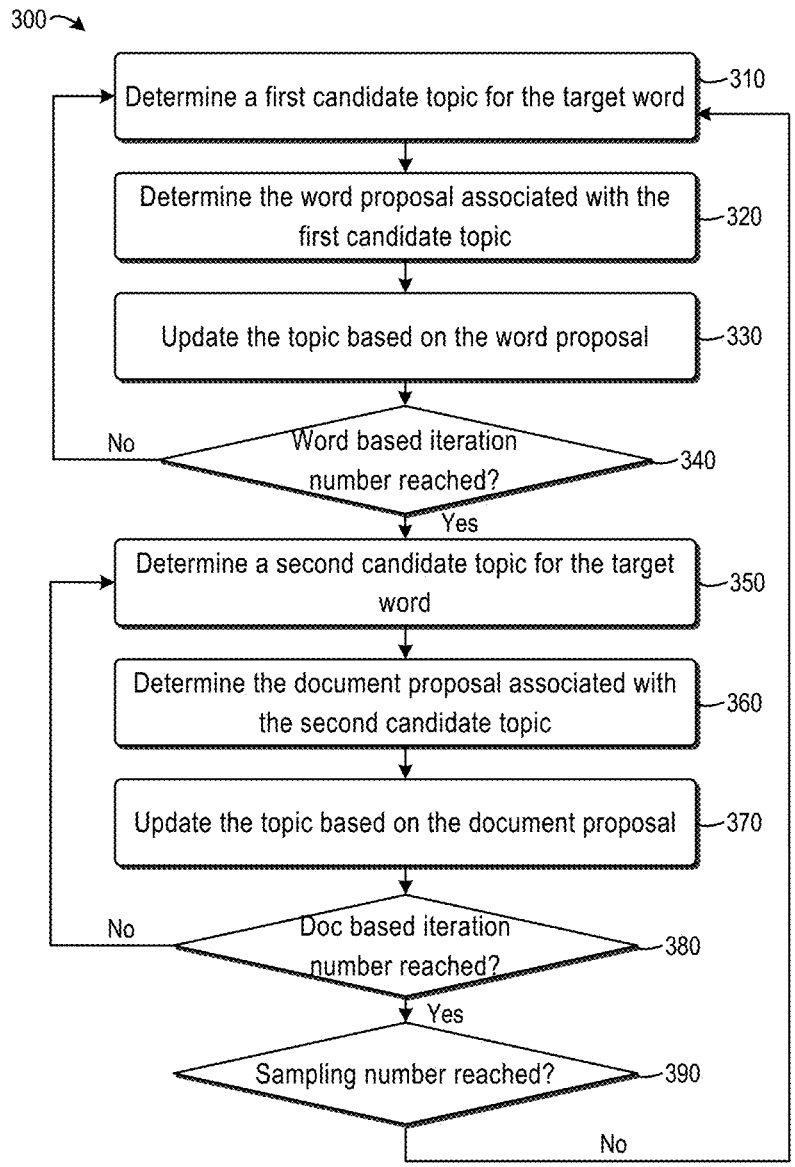
FIG. 3 illustrates a flowchart of a method for determining topics of words in a document in accordance with one implementation of the subject matter described herein.

FIG. 3 shows the flowchart of a method 300 for model training in accordance with implementations of the subject matter herein. For the ease of discussion, the method 300 will be discussed with reference to the topic model where the documents act as the training data. As described above, in each training document in the corpus, there are one or more tokens at which the respective words are located. The method 300 can be implemented to determine the topic value of any target word located at the token being scanned in target document in the corpus. In the following examples, the word proposal and document proposal will be described as example of the element proposal and context proposal, respectively. It is to be understood that all the features described below with reference to the word proposal and document proposal apply to any other element proposal and context proposal.

As shown, the method 300 is entered at step 310 where the first candidate value for the property is determined. More specifically, in this example, a first candidate topic for the target word located at the token being scanned is determined.

In some implementations, the first candidate topic may be selected from a plurality of predefined candidate topics. In one implementation, it is possible to randomly select a candidate topic, for example, from the list 180 shown in FIG. 1 as the first candidate topic. Alternatively, in order to improve the efficiency of the sampling, in some other implementations, the selection of the first candidate may be done based on the probability distribution of the plurality of candidate topics.

In general, it is desirable to select the candidate topic with relatively high prior probability as the first candidate topic. In one implementation, this can be done by transforming the initial probability distribution of the candidate topics into the uniform probability distribution. First, the probability distribution of the plurality of candidate topics is obtained. Such probability distribution may be determined in advance, for example, according to the experience, statistics, manual labeling, or other prior knowledge. It would be appreciated that the initial probability distribution is usually a non-uniform distribution. In one implementation, such non-uniform probability distribution may be transformed into a uniform probability distribution in order to improve the operation efficiency. Any suitable techniques for transforming non-uniform probability distribution into uniform probability distribution may be applied, either currently known or to be developed in the future. As an example, a graphical representation of the transformation is shown in FIG. 4.

Figure 4:
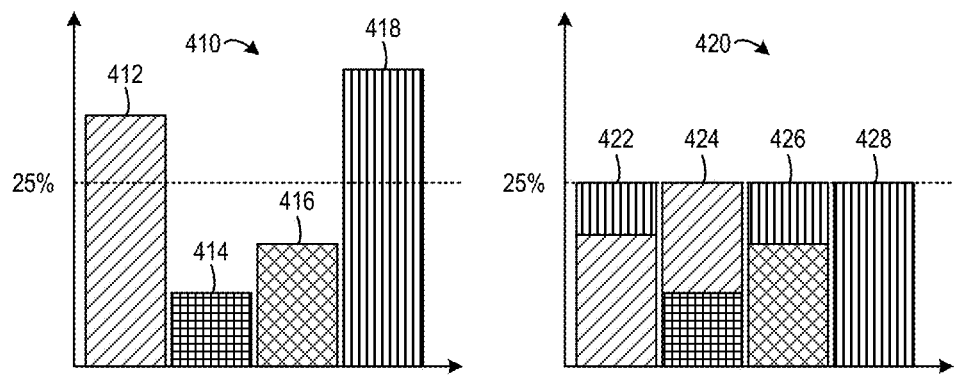
FIG. 4 illustrates a schematic diagram of the probability distribution transformation in accordance with one implementation of the subject matter described herein.
Figure 5A:
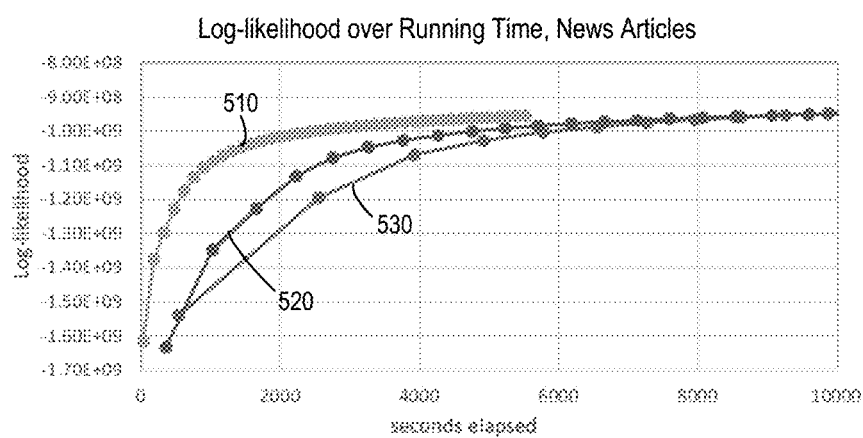
FIGS. 5A-5D illustrates diagrams of experiment results on different corpuses in accordance with one implementation of the subject matter described herein.
Figure 5B:
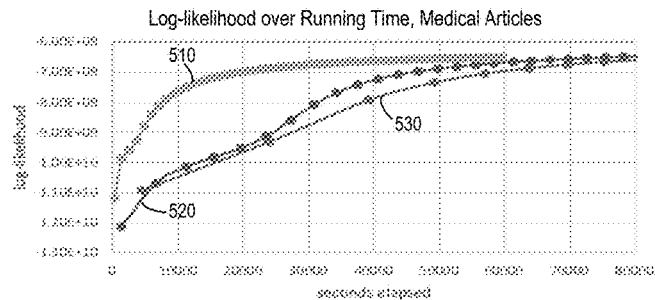
Figure 5C:
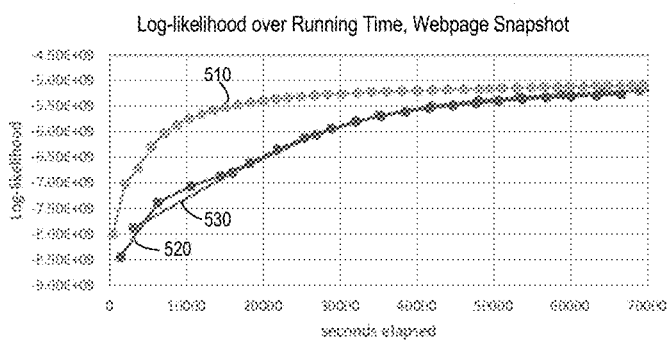
Figure 5D:
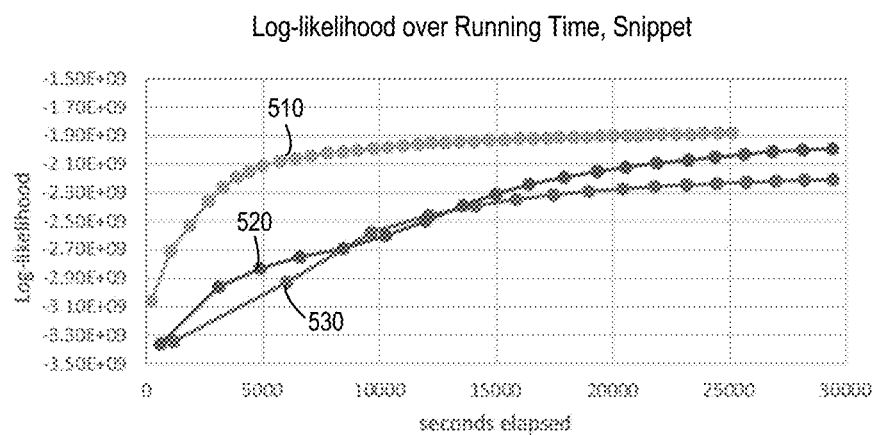

FIG. 4 shows a schematic diagram of the probability distribution transformation. This procedure transforms a non-uniform sampling problem into a uniform sampling one. The probability values for different topics can be represented by the bins. In FIG. 4, the bins for different probability values are represented by different patterns. As shown, the initial probability distribution 410 is a non-uniform distribution where the bins 412, 414, 416 and 418 have different heights and each of the bins 412, 414, 416 and 418 is only associated with a single topic. The transformation is to equalize the height of bins. To this end, one or more bins may be modified to represent more than one probability value. By transforming the initial probability distribution 410, the new probability distribution 420 may be obtained where the four bins 422, 424, 426 and 428 are of the same height. That is to say, the resulting probability distribution 420 is a uniform distribution. It is to be understood that the probability distribution 420 is just an example. Given an initial distribution, it is possible to obtain a uniform distribution in various ways.

In one implementation, the resulting uniform probability distribution for the target word may be stored an alias table(s). Still with reference to the example shown in FIG. 4, it can be seen that each of bins 422, 424, 426 and 428 in the uniform probability is associated with one or more topics. Accordingly, the alias table may store the splitting point of each bin and the alias value above or below that splitting point. Such alias table can be reused once constructed. By means of such reusable alias table, the selection of the first candidate topic and thus the determination of the word proposal can be performed efficiently, for example, with the time cost of O(1). Moreover, it would be appreciated that the distribution of the candidate topics may change over time. Accordingly, in one implementation, the alias table may be updated, for example, after one or more rounds of the sampling. Additionally or alternatively, the alias table may be updated at the user's command, for example.

In step 310, the first candidate topic may be determined based on the resulting uniform probability distribution. For example, in one implementation, a random number may be generated by a random number generator (RNG). Various random number generation algorithms, either currently known or to be developed in the future, can be used herein. Then one of the plurality of candidate topics may be selected based on the generated random and the uniform probability distribution. For example, the random number may be mapped as a point onto a graphical representation of the uniform probability distribution as shown in FIG. 4. Alternatively, it is also possible to directly generate a random position on the graphical representation of the uniform probability distribution. Based on the position of the point, one of the candidate topics may be selected as the first candidate topic.

Still in reference to FIG. 3, the method 300 proceeds to step 320, where the word proposal associated with the determined first candidate topic is determined. This word proposal indicates the probability that the target word is assigned with the first candidate topic as determined in step 310, independently of the current document where the word is included, as described above. That is to say, the word proposal is word dependent and document independent.

In one implementation, in step 320, the word proposal may be determined based on a first count of a first set of tokens and a second count of a second set of tokens in the entire corpus. In the first set of tokens, every token contains the target word assigned with the first candidate topic. In the second set of tokens, each token contains a word (which may or may not be the target word) assigned with the first candidate topic.

For instance, the target word may be "Mobile" and the first candidate topic may be "Technology." The first count indicates the number of tokens containing the target word "Mobile" assigned with the topic of "Technology" across all the documents in the corpus. The second count indicates the number of words assigned with the topic of "Technology" across all the documents in the corpus.

In one implementation, the word proposal p (k) for the target word with respect to the first candidate topic k is calculated as follows:

$$p_w(k) \propto \frac{n_{kw} + \beta_w}{n_k + \beta},$$

where $n_{kw}$ represents the first count, $n_k$ represents the second count, $\beta_w$ represents a concentration parameter, and $\beta := \Sigma_w \beta_w$, $n_{kd}^{-di}$. Specifically, in one implementation, the target word itself may be excluded when determining the first and/or second counts.

Then, in step 330, the topic of the target word is updated based on the word proposal. To this end, an acceptance probability of a transition from the current topic assigned to the target word to the first candidate topic selected in the step 310. For the sake of discussion, this acceptance probability is referred to as the "element acceptance probability" (or "word acceptance probability" in this example).

In general, the word acceptance probability is determined based on the word proposal. Particularly, in addition to the word proposal associated with the first candidate topic as determined in step 320, a current word proposal associated with the current topic assigned to the target word is determined. Then the word acceptance probability may be obtained based on the current word proposal associated with the current topic and the word proposal associated with the first candidate topic.

For example, in one implementation, the word acceptance probability of a state transition from the current topic s to the first candidate topic t may be determined as follows:

$$\min\left\{1, \frac{p(t)p_w(s)}{p(s)p_w(t)}\right\}$$

where $p_w(s)$ and $p_w(t)$ represent the word proposal associated with the topics s and t, respectively, and $p(s)$ and $p(t)$ represent the prior probability of the topics s and t, respectively. It is to be understood that the above example is described only for the purpose of illustration, without suggesting any limitation as to the scope of the subject matter described herein. The word acceptance probability may be determined in any other suitable ways.

In step 330, if the word acceptance probability exceeds a predefined threshold, the topic of the target word is changed from the current topic to the first candidate topic as selected in step 310. Otherwise, if the word acceptance probability is below the predefined threshold, the current topic will remain unchanged. The value of the threshold can be set according to the experience or specified by the user and can be dynamically updated.

In accordance with implementations of the subject matter described herein, the topic of the target word can be updated based on the word proposal in a quite efficient way. Let $$\pi_w := \frac{p(t)p_w(s)}{p(s)p_w(t)},$$

it can be shown that $$\pi_w = \frac{(n_{td}^{-di} + \alpha_t)(n_{tw}^{-di} + \beta_w)(n_s^{-di} + \overline{\beta})(n_{sw} + \beta_w)(n_t + \overline{\beta})}{(n_{sd}^{-di} + \alpha_s)(n_{sw}^{-di} + \beta_w)(n_t^{-di} + \overline{\beta})(n_{tw} + \beta_w)(n_s + \overline{\beta})}.$$

where $n_{td}^{-di}$ and $n_{sd}^{-di}$ represent the counts of tokens in the document d that are assigned with the topics t and s (excluding the current token $z_{di}$), respectively, $n_{tw}^{-di}$ and $n_{sw}^{-di}$ represent the counts of tokens containing the word w (across all the documents in the corpus) that assigned with the topics t and s, respectively, $n_t^{-di}$ and $n_s^{-di}$ represent the number of tokens (across all the documents in the corpus) assigned with the topics t and s, respectively.

It can be seen from the above equation that once the word proposal is $p_w$ is sampled, the word acceptance probability can be obtained in O(1) time, as long as the sufficient statistics are tracked during sampling. Moreover, the word proposal $p_w$ can be sampled in O(1) time by transforming the non-uniform probability distribution of the candidate topics into the uniform one (alias table), as described above. As a result, the topic may be updated based on the word proposal efficiently.

It would be appreciated that although the use of the alias table has low amortized time cost, its space complexity might be high because the alias table for each word's proposal distribution needs to store the splitting point of each bin and the alias value above that splitting point. This would cause high space cost if a lot of words' alias tables are to be stored. In order to reduce the space cost, in some implementations, the alias table may be sparsified. For example, in one implementation, the word proposal $p_w$ may be decomposed into two terms, as follows:

$$p_w = \frac{n_{kw}}{n_k + \beta} + \frac{\beta_w}{n_k + \beta}$$

Then one of these two terms may be drawn with probability given by their masses, which is known as a mixture approach. If the first term is drawn, the first candidate topic may be selected based on a pre-constructed, sparse alias table which is created from $n_{kw}$ and which is specific to word w. If the second term is drawn, the first candidate topic may be selected based on a dense, pre-constructed alias table which is created from $n_k$ and which is common to all words. In this way, both the time and space costs are reduced.

Next the method 300 proceeds to step 340, where it is determined whether the predefined iteration number for the word-proposal based topic update has been reached. That is to say, the topic update based on the word proposal may be repeatedly performed one or more times. If the number has not yet been reached, the method 300 returns to select the first candidate topic (step 310), determine the associated word proposal (step 320) and update the topic of the target word based on the word proposal (step 330).

On the other hand, if it is determined in step 340 that the predefined iteration number has already been reached, the document proposal will be determined and used to further update the topic. More specifically, the method 300 proceeds to step 350, where the second candidate topic for the target word is determined. Similar to the first candidate topic, in one implementation, the second candidate value may be selected from the predefined candidate topics based on the distribution thereof, for example.

Then in step 360, the document proposal associated with the second candidate value is determined. In one implementation, the document proposal may be determined based on the count (referred to as the "third count") of a set of tokens (referred to as the "third set of tokens") in the document. Each one in the third set of tokens contains a word (may or may not be the target word) assigned with the second candidate topic. More specifically, the document proposal pa associated with the second candidate topic k may be determined as follows:

$$p_d(k) \propto n_{kd} + \alpha_k$$

where $n_{kd}$ represents the third count, and $\alpha_k$ represents a parameter.

The method 300 then proceeds to step 370 to update the topic the target word, which has already been updated one or more times based on the word proposal through steps 310 to 330, based on the document proposal $p_d$. In one implementation, in step 370, an acceptance probability of a state transition from the current topic s to the second candidate topic t may be obtained. For the sake of discussion, this acceptance probability is referred to the "context acceptance probability" (or "document acceptance probability" in this example).

In general, the document acceptance probability is determined based on the document proposal. Particularly, in addition to the document proposal associated with the second candidate topic as determined in step 360, a current document proposal associated with the current topic assigned to the target word is determined. Then the document acceptance probability may be obtained based on the current document proposal and the document proposal associated with the second candidate topic.

For example, in one implementation, the document acceptance probability of a state transition from the current topic s to the first candidate topic t may be determined as follows:

$$\min\left\{1, \frac{p(t)p_d(s)}{p(s)p_d(t)}\right\}$$

where $p_d(s)$ and $p_d(t)$ represent the document proposal for the topics s and t, respectively. It is to be understood that the above example is given merely for the purpose of illustration, without suggesting any limitation as to the scope of the subject matter described herein. The document acceptance probability may be determined in any other suitable ways.

If the document acceptance probability exceeds a predefined threshold, the topic of the target word is changed from the current topic to the second candidate topic as selected in step 350. Otherwise, if the document acceptance probability is below the predefined threshold, the current topic will remain unchanged.

In accordance with implementations of the subject matter described herein, the topic of the target word can be updated based on the document proposal in a quite efficient way. Let $$\pi_d := \frac{p(t)p_d(s)}{p(s)p_d(t)},$$

it can be shown that $$\pi_d = \frac{(n_{td}^{-di} + \alpha_t)(n_{tw}^{-di} + \beta_w)(n_s^{-di} + \bar{\beta})(n_{sd} + \alpha_s)}{(n_{sd}^{-di} + \alpha_s)(n_{sw}^{-di} + \beta_w)(n_t^{-di} + \bar{\beta})(n_{td} + \alpha_t)}$$

It can be seen that the document proposal accepts whenever topic t is popular (relative to topic s) within document d or popular for word w itself. In order to reduce the space cost, in one implementation, the document proposal may be decomposed into two terms, as follows:

$$p_d(k) \propto \frac{n_{kd}}{n_d + \alpha} + \frac{\alpha_k}{n_d + \alpha}.$$

When the first term is selected, it is not even necessary to explicitly build the alias table because the topic indicators of the document tokens can serve as an alias table. Particularly, the first term $n_{kd}$ counts the number of times that the topic k occurs in document d. In other words, $$n_{kd} = \sum_{i=1}^{n_d} [z_{di} = k]$$

where $z_{di}$ represents the set of topic indicators of the document token, and [.] represents the indicator function. This means that the array $z_{di}$ is an alias table for the unnormalized probability distribution $n_{kd}$. Therefore, $n_{kd}$ may be sampled by simply drawing an integer j uniformly from $\{1, 2, \ldots, n_d\}$ and setting $z_{di} = z_{dj}$. As a result, the document proposal can be sampled in O(1) non-amortized time because it is unnecessary to construct an alias table.

The method 300 proceeds to step 380 to determine whether the predefined iteration number for the document-proposal based topic update is reached. That is to say, the topic update based on the document proposal may be repeatedly performed one or more times. If it is determined that the iteration number has not yet been reached, the method 300 returns to select the second candidate topic (step 350), determine the associated document proposal (step 360) and update the topic of the target word based on the document proposal (step 370).

On the other hand, if it is determined in step 380 that the predefined iteration number has already been reached, the method 300 proceeds to step 390 to determine whether the predefined sampling number is reached. If not, the method 300 returns to step 310 to repeat the sampling based on the cycle proposal. That is, for each token, the sampling based on the combination of the word proposal and document proposal may be performed for predefined times. If it is determined in step 390 that the sampling number has been reached, the sampling of the token is completed.

It would be appreciated that the sampling according the method 300 is essentially a kind of Metropolis-Hastings (HM) sampling. Instead of using a single proposal, implementations of the subject matter described herein construct two kinds of efficient proposals (which can be obtained in O(1) time, for example) and alternate between them. The decomposition of the proposal distribution may be represented as follows:

$$q(z_{di} = k \mid \text{rest}) \propto \underbrace{(n_{kd} + \alpha_k)}_{doc\text{-}proposal} \times \underbrace{\frac{n_{kw} + \beta_w}{n_k + \bar{\beta}}}_{word\text{-}proposal}$$

It is to be understood that either the word proposal or document proposal can be used as efficient MH algorithm for LDA alone. In practice, however, many MH-steps (repeatedly sampling each token) are required to produce proper mixing. With a small number of MH-steps, using the word proposal alone encourages sparsity in word topic distribution (i.e. each word belongs to few topics) but causes low sparsity in document-topic distributions (i.e. each document contains many topics). Conversely, using the document proposal alone with few MH-steps leads to sparsity in document-topic distribution but non-sparse word-topic distributions. Therefore, while either proposal can sample tokens very quickly, they need many MH-steps to mix well.

In order to reduce the MH-steps, instead of using the word proposal or document proposal alone, they are combined to form the cycle proposal:

$$p_c(k) \propto p_d(k)p_w(k).$$

The word proposal is good at proposing only its own modes, resulting in concentration of words in a few topics. Likewise, the document proposal may result in concentration of the documents onto a few topics. As discussed above, the MH sequence for each token is constructed by alternating between the word proposal and the document proposal. By combining the word and document proposals in this way, the cycle proposal can quickly explore the state space and reach all states with high probability (the modes). Theoretically it can be proved that such cycle MH proposals are guaranteed to converge. By combining the two proposals in this manner, all modes will be proposed with sufficiently high probability, by at least one of the proposals. In addition, by cycling different proposals, the auto-correlation among sampled states can be reduced, thereby exploring the state space more quickly.

In the training, the documents in the corpus may be scanned token by token. For each token, the combined proposal such as the cycle proposal is used to assign the word located at the token with a certain topic. After all the documents are scanned, a round of training is completed. Through one or more rounds of such training, a good model may be obtained with the training time reduced to realistic levels.

An implementation of the subject matter described herein is compared with the Sparse LDA and Alias LDA. The following four corpuses are used in the model training: (1) News Articles contains articles published by an exemplary newspaper between years 1987 and 2007; (2) Medical Articles is the full set of biomedical literature abstracts from an exemplary archive of medical publications; (3) Webpage Snapshot contains all the articles extracted from a snapshot of an exemplary webpage on Feb. 13, 2014; and (4) Snippet is a private data set that contains a subset of snippets relating to popular Ads queries generated by a search engine. The experiments are carried out on a server with Intel E5-2695 processor with a 2.4 GHz clock rate. A model with 1024 topics is trained. In the experiments, the log-likelihood over the whole training set is obtained.

FIGS. 5A-5D show the experiment results. In FIGS. 5A-5D, curves 510, 520 and 530 represent the log-likelihood over running time of the implementation of the subject matter described herein, Alias LDA and the Sparse LDA, respectively, when being applied on the corpuses. It can be seen that the implementation of the subject matter described herein converges much faster than the other approaches. Moreover, it is found that compared with conventional approaches, the cost in each iteration is much lower in the implementation of the subject matter described herein.

Figure 6:
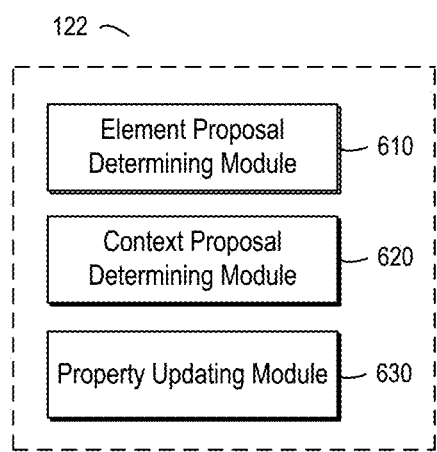
FIG. 6 illustrates a block diagram of a computer program product for model training in accordance with one implementation of the subject matter described herein.

FIG. 6 illustrates a block diagram of a computer program 122 for model training in accordance with one implementation of the subject matter described herein. The computer program 122 can be loaded into the memory 120 of the device 101 and executed by the processing unit 110, as described above.

As shown, the computer program 122 includes an element proposal determining module 610 configured to determine an element proposal associated with a first candidate value for a property of a target element, the target element being located at a token in target data in a corpus that includes multiple pieces of data, the element proposal indicating a probability that the first candidate value is assigned to the property independently of a context of the data. The computer program 122 further includes a context proposal determining module 620 configured to determine a context proposal associated with a second candidate value for the property of the target element, the context proposal indicating a probability that the second candidate value is assigned to the property in the context of the target data. The computer program 122 further includes a property updating module 630 configured to update a current value of the property of the target element based on a combination of the element proposal and the context proposal.

In some implementations, the computer program 122 may include: a distribution obtaining module configured to obtain a probability distribution of a plurality of candidate values for the property; a distribution transforming module configured to transform the probability distribution into a uniform probability distribution; and a candidate determining module configured to determine at least one of the first and second candidate values from the plurality of candidate values based on the uniform probability distribution. In one implementation, the candidate determining module is configured to determine the candidate value from the plurality of candidate values by obtaining a position on a graphical representation of the uniform probability distribution and selecting one of the plurality of candidate values based on the position and the uniform probability distribution. In one implementation, the uniform distribution for the target element may be stored in a reusable alias table as a set of bins. Each of the bins being associated with at least one of the plurality of the candidate values. The alias table stores the splitting point within each bin and the alias value above or below that splitting point In some implementations, the computer program 122 may include a first counting module configured to determine a first count of a first set of tokens in the multiple pieces of data in the corpus, each of the first set of tokens containing the target element with the first candidate value assigned to the property. The computer program 122 may further include a second counting module configured to determine a second count of a second set of tokens in the multiple pieces of data in the corpus, each of the second set of tokens containing an element with the first candidate value assigned to the property. In such implementation, the element proposal determining module 610 is configured to determine the element proposal based on the first and second counts.

In some implementations, the computer program 122 may include a third counting module configured to determine a third count of a third set of tokens in the target data, each of the third containing an element with the second candidate value assigned to the property. In such implementation, the context proposal determining module 620 is configured to determine the context proposal based on the third count.

In some implementations, the property updating module 630 is configured to update the current value of the property comprises alternating between the element proposal and the context proposal. More specifically, the property updating module 630 may include an element-based updating module configured to iteratively determine the element proposal and updating the current value of the property based on the element proposal at least one time to obtain an updated value of the property; and a data-based updating module configured to iteratively determine the context proposal and updating the updated value of the property based on the context proposal at least one time.

In one implementation, the element-based updating module is configured to determine a current element proposal for the current value of the property, the current element proposal indicating a probability that the current value is assigned to the property independently of the context of the target data; determine an element acceptance probability based on the element proposal for the first candidate value and the current element proposal for the current value, the element acceptance probability indicating a probability of a transition from the current value to the first candidate value; change the current value to the first candidate value if the element acceptance probability exceeds a predefined threshold; and maintain the current value unchanged if the element acceptance probability is below the predefined threshold.

In one implementation, the data-based updating module is configured to determine a current context proposal for the updated value of the property, the current context proposal indicating a probability that the updated value is assigned to the property in the context of the target data; determine a context acceptance probability based on the context proposal for the second candidate value and the current context proposal for the current value, the context acceptance probability indicating a probability of a transition from the updated value to the second candidate value; change the updated value to the second candidate value if the context acceptance probability exceeds a predefined threshold; and maintain the updated value unchanged if the context acceptance probability is below the predefined threshold.

The functionally described herein can be performed, at least in part, by one or more hardware logic components. For example, and without limitation, illustrative types of hardware logic components that can be used include Field- Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter described herein are listed below.

In one implementation, a device comprises a processing unit; a memory coupled to the processing unit and including modules, when executed by the processing unit, cause the device to sample a token in target data in a corpus that includes multiple pieces of data, the modules including: an element proposal determining module configured to determine an element proposal associated with a first candidate value for a property of a target element located at the token, the element proposal indicating a probability that the first candidate value is assigned to the property independently of a context of the target data; a context proposal determining module configured to determine a context proposal associated with a second candidate value for the property of the target element, the context proposal indicating a probability that the second candidate value is assigned to the property in the context of the target data; and a property updating module configured to update a current value of the property of the target element based on a combination of the element proposal and the context proposal.

In one implementation, the memory further includes: a distribution obtaining module configured to obtain a probability distribution of a plurality of candidate values for the property; a distribution transforming module configured to transform the probability distribution into a uniform probability distribution; and a candidate determining module configured to determine at least one of the first and second candidate values from the plurality of candidate values based on the uniform probability distribution.

In one implementation, the candidate determining module is configured to determine a position on a graphical representation of the uniform probability distribution; and select one of the plurality of candidate values based on the position and the uniform probability distribution.

In one implementation, the processing unit is configured to store the uniform distribution for the target element as a set of bins in a reusable alias table, each of the bins being associated with at least one of the plurality of the candidate values.

In one implementation, the memory further includes a first counting module configured to determine a first count of a first set of tokens in the multiple pieces of data in the corpus, each of the first set of tokens containing the target element with the first candidate value assigned to the property; and a second counting module configured to determine a second count of a second set of tokens in the multiple pieces of data in the corpus, each of the second set of tokens containing an element with the first candidate value assigned to the property, wherein the element proposal determining module is configured to determine the element proposal based on the first and second counts.

In one implementation, the memory further includes: a third counting module configured to determine a third count of a third set of tokens in the target data, each of the third containing an element with the second candidate value assigned to the property, wherein the context proposal determining module is configured to determine the context proposal based on the third count.

In one implementation, the element proposal determining module and the context proposal determining module operate alternately, and wherein the property updating module is configured to: update the current value of the property based on the element proposal provided by the element proposal determining module to obtain an updated value of the property; and update the updated value of the property based on the context proposal provided by the context proposal determining module.

In one implementation, the property updating module is configured to update the current value of the property based on the element proposal by: determining a current element proposal associated with the current value of the property, the current element proposal indicating a probability that the current value is assigned to the property independently of the context of the target data; determining an element acceptance probability based on the element proposal associated with the first candidate value and the current element proposal, the element acceptance probability indicating a probability of a transition from the current value to the first candidate value; changing the current value to the first candidate value if the element acceptance probability exceeds a predefined threshold; and maintaining the current value unchanged if the element acceptance probability is below the predefined threshold.

In one implementation, the property updating module is configured to update the updated value of the property based on the context proposal by: determining a current context proposal associated with the updated value of the property, the current context proposal indicating a probability that the updated value is assigned to the property in the context of target data; determining a context acceptance probability based on the context proposal associated with the second candidate value and the current context proposal, the context acceptance probability indicating a probability of a transition from the updated value to the second candidate value; changing the updated value to the second candidate value if the context acceptance probability exceeds a predefined threshold; and maintaining the updated value unchanged if the context acceptance probability is below the predefined threshold.

In one implementation, a computer-implemented method comprises: determining an element proposal associated with a first candidate value for a property of a target element, the target element being located at a token in target data in a corpus that includes multiple pieces of data, the element proposal indicating a probability that the first candidate value is assigned to the property independently of a context of the data; determining a context proposal associated with a second candidate value for the property of the target element, the context proposal indicating a probability that the second candidate value is assigned to the property in the context of the target data; and updating a current value of the property of the target element based on a combination of the element proposal and the context proposal.

In one implementation, the method further comprises: obtaining a probability distribution of a plurality of candidate values for the property; transforming the probability distribution into a uniform probability distribution; and determining at least one of the first and second candidate values from the plurality of candidate values based on the uniform probability distribution.

In one implementation, determining the candidate value from the plurality of candidate values comprises: determining a position on a graphical representation of the uniform probability distribution; and selecting one of the plurality of candidate values based on the position and the uniform probability distribution.

In one implementation, the method further comprises: storing the uniform distribution for the target element as a set of bins in a reusable alias table, each of the bins being associated with at least one of the plurality of the candidate values.

In one implementation, determining the element proposal comprises: determining a first count of a first set of tokens in the multiple pieces of data in the corpus, each of the first set of tokens containing the target element with the first candidate value assigned to the property; determining a second count of a second set of tokens in the multiple pieces of data in the corpus, each of the second set of tokens containing an element with the first candidate value assigned to the property; determining the element proposal based on the first and second counts.

In one implementation, determining the context proposal comprises: determining a third count of a third set of tokens in the target data, each of the third containing an element with the second candidate value assigned to the property; and determining the context proposal based on the third count.

In one implementation, updating the current value of the property comprises alternating between the element proposal and the context proposal, including performing the following at least one time: updating the current value of the property based on the element proposal to obtain an updated value of the property; and updating the updated value of the property based on the context proposal.

In one implementation, updating the current value of the property based on the element proposal comprises: determining a current element proposal associated with the current value of the property, the current element proposal indicating a probability that the current value is assigned to the property independently of the context of the target data; determining an element acceptance probability based on the element proposal associated with the first candidate value and the current element proposal for the current value, the element acceptance probability indicating a probability of a transition from the current value to the first candidate value; changing the current value to the first candidate value if the element acceptance probability exceeds a predefined threshold; and maintaining the current value unchanged if the element acceptance probability is below the predefined threshold.

In one implementation, updating the updated value of the property based on the context proposal comprises: determining a current context proposal associated with the updated value of the property, the current context proposal indicating a probability that the updated value is assigned to the property in the context of the target data; determining a context acceptance probability based on the context proposal associated with the second candidate value and the current context proposal, the context acceptance probability indicating a probability of a transition from the updated value to the second candidate value; changing the updated value to the second candidate value if the context acceptance probability exceeds a predefined threshold; and maintaining the updated value unchanged if the context acceptance probability is below the predefined threshold.

In one implementation, a system comprises: a corpus includes a plurality of documents; and a device including a processing unit and a memory and having access to the corpus, the memory coupled to the processing unit and including modules executable by the processing unit, the modules including: an element proposal determining module configured to determine a word proposal associated with a first candidate topic for a target word, the target word being located at a token in a target document from the plurality of documents, the word proposal indicating a probability that the first candidate topic is assigned to the target word independently of a context of the target document; a context proposal determining module configured to determine a document proposal associated with a second candidate topic for the target word, the document proposal indicating a probability that the second candidate topic is assigned to the target word in the context of the target document; and a property updating module configured to update a current topic of the target word by alternately using the word proposal and the document proposal.

In one implementation, the property updating module is configured to: cause the element proposal determining module to determine the word proposal; update the current topic of the target word based on the word proposal to obtain an updated topic of the target word; cause the context proposal determining module to determine the document proposal; and update the updated topic of the target word based on the document proposal Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A device comprising:
a processing unit;
a memory coupled to the processing unit, wherein the memory and the processing unit are respectively consisted to store and execute instructions for causing the computing device to perform operations, the operations including:
performing computer-based model training, including:
determining an element proposal associated with a first candidate value for a property of a target element located at a token in target data in a computer-based training corpus, the element proposal indicating a probability that the first candidate value is assigned to the property independently of a context of the target data in the computer-based training corpus;
determining a context proposal associated with a second candidate value for the property of the target element located at the token in the target data in the computer-based training corpus, the context proposal indicating a probability that the second candidate value is assigned to the property in the context of the target data in the computer-based training corpus; and
updating the computer-based training corpus, including storing an updated value of the property of the target element located at the token in the target data in the computer-based training corpus based on a combination of the element proposal and the context proposal.

2. The device of claim 1, wherein the operations further include:
obtaining a probability distribution of a plurality of candidate values for the property;
transforming the probability distribution into a uniform probability distribution; and
determining at least one of the first and second candidate values from the plurality of candidate values based on the uniform probability distribution.

3. The device of claim 2, wherein the operations further include:
determining a position on a graphical representation of the uniform probability distribution; and
selecting one of the plurality of candidate values based on the position and the uniform probability distribution.

4. The device of claim 2, wherein the operations further include:
storing the uniform distribution for the target element located at the token in the target data in the computer-based training corpus as a set of bins in a reusable alias table, each of the bins being associated with at least one of the plurality of the candidate values.

5. The device of claim 1, wherein the operations further include:
determining a first count of a first set of tokens in the multiple pieces of data in the computer-based training corpus, each of the first set of tokens containing the target element with the first candidate value assigned to the property; and determining a second count of a second set of tokens in the multiple pieces of data in the computer-based training corpus, each of the second set of tokens containing an element with the first candidate value assigned to the property,
wherein the element proposal is based on the first and second counts.

6. The device of claim 1, wherein the operations further include:
determining a third count of a third set of tokens in the target data in the computer-based training corpus, each of the third containing an element with the second candidate value assigned to the property,
wherein the context proposal is based on the third count.

7. The device of claim 1, wherein the operations further include:
updating the current value of the property based on the element proposal provided by the element proposal determining module to obtain an updated value of the property; and
updating the updated value of the property based on the context proposal provided by the context proposal determining module.

8. The device of claim 7, wherein the updating of the current value of the property based on the element proposal includes:
determining a current element proposal associated with the current value of the property, the current element proposal indicating a probability that the current value is assigned to the property independently of the context of the target data in the computer-based training corpus;
determining an element acceptance probability based on the element proposal associated with the first candidate value and the current element proposal, the element acceptance probability indicating a probability of a transition from the current value to the first candidate value;
changing the current value to the first candidate value if the element acceptance probability exceeds a predefined threshold; and
maintaining the current value unchanged if the element acceptance probability is below the predefined threshold.

9. The device of claim 7, wherein the updating of the updated value of the property based on the context proposal includes:
determining a current context proposal associated with the updated value of the property, the current context proposal indicating a probability that the updated value is assigned to the property in the context of target data in the computer-based training corpus;
determining a context acceptance probability based on the context proposal associated with the second candidate value and the current context proposal, the context acceptance probability indicating a probability of a transition from the updated value to the second candidate value;
changing the updated value to the second candidate value if the context acceptance probability exceeds a predefined threshold; and
maintaining the updated value unchanged if the context acceptance probability is below the predefined threshold.

10. A computer-implemented method comprising:
performing computer-based model training, including:
determining an element proposal associated with a first candidate value for a property of a target element, the target element being located at a token in target data in a computer-based training corpus that includes multiple pieces of data, the element proposal indicating a probability that the first candidate value is assigned to the property independently of a context of the target data in the computer-based training corpus;

determining a context proposal associated with a second candidate value for the property of the target element located at the token in the target data in the computer-based training corpus, the context proposal indicating a probability that the second candidate value is assigned to the property in the context of the target data in the computer-based training corpus; and updating the computer-based training corpus, including storing an updated value of the property of the target element located at the token in the target data in the computer-based training corpus based on a combination of the element proposal and the context proposal.

11. The method of claim 10, wherein the computer-based model training further comprises:

obtaining a probability distribution of a plurality of candidate values for the property;

transforming the probability distribution into a uniform probability distribution; and determining at least one of the first and second candidate values from the plurality of candidate values based on the uniform probability distribution.

12. The method of claim 11, wherein determining the candidate value from the plurality of candidate values comprises:

determining a position on a graphical representation of the uniform probability distribution; and selecting one of the plurality of candidate values based on the position and the uniform probability distribution.

13. The method of claim 11, wherein the computer-based model training further comprises:

storing the uniform distribution for the target element located at the token in the target data in the computer-based training corpus as a set of bins in a reusable alias table, each of the bins being associated with at least one of the plurality of the candidate values.

14. The method of claim 10, wherein determining the element proposal comprises:

determining a first count of a first set of tokens in the multiple pieces of data in the computer-based training corpus, each of the first set of tokens containing the target element with the first candidate value assigned to the property;

determining a second count of a second set of tokens in the multiple pieces of data in the computer-based training corpus, each of the second set of tokens containing an element with the first candidate value assigned to the property;

determining the element proposal based on the first and second counts.

15. The method of claim 10, wherein determining the context proposal comprises:

determining a third count of a third set of tokens in the target data in the computer-based training corpus, each of the third containing an element with the second candidate value assigned to the property; and determining the context proposal based on the third count.

16. The method of claim 10, wherein updating the current value of the property comprises alternating between the element proposal and the context proposal, including performing the following at least one time:

updating the current value of the property based on the element proposal to obtain an updated value of the property; and updating the updated value of the property based on the context proposal.

17. The method of claim 16, wherein updating the current value of the property based on the element proposal comprises:

determining a current element proposal associated with the current value of the property, the current element proposal indicating a probability that the current value is assigned to the property independently of the context of the target data in the computer-based training corpus;

determining an element acceptance probability based on the element proposal associated with the first candidate value and the current element proposal for the current value, the element acceptance probability indicating a probability of a transition from the current value to the first candidate value;

changing the current value to the first candidate value if the element acceptance probability exceeds a predefined threshold; and maintaining the current value unchanged if the element acceptance probability is below the predefined threshold.

18. The method of claim 16, wherein updating the updated value of the property based on the context proposal comprises:

determining a current context proposal associated with the updated value of the property, the current context proposal indicating a probability that the updated value is assigned to the property in the context of the target data in the computer-based training corpus;

determining a context acceptance probability based on the context proposal associated with the second candidate value and the current context proposal, the context acceptance probability indicating a probability of a transition from the updated value to the second candidate value;

changing the updated value to the second candidate value if the context acceptance probability exceeds a predefined threshold; and maintaining the updated value unchanged if the context acceptance probability is below the predefined threshold.

19. A system comprising:

a memory and a processor, wherein the memory and the processor are respectively consisted to store and execute instructions for causing the computing device to perform operations, the operations including:

performing computer-based model training, including:

accessing a computer-based training corpus that includes a plurality of documents;

determining a word proposal associated with a first candidate topic for a target word, the target word being located at a token in a target document from the plurality of documents in the computer-based training corpus, the word proposal indicating a probability that the first candidate topic is assigned to the target word independently of a context of the target document in the computer-based training corpus;

determining a document proposal associated with a second candidate topic for the target word located at the token in the target document from the plurality of documents in the computer-based training corpus, the document proposal indicating a probability that the second candidate topic is assigned to the target word in the context of the target document in the computer-based training corpus; and updating the computer-based training corpus, including storing an updated topic of the target word by alternately using the word proposal and the document proposal.

20. The system of claim 19, wherein the operations further include:

obtaining a probability distribution of a plurality of candidate topics for the target word;

transforming the probability distribution into a uniform probability distribution; and determining at least one of the first and second candidate topics from the plurality of candidate topics based on the uniform probability distribution.

* * * * *